S. B. HARNER.
MILKING APPARATUS.
APPLICATION FILED NOV. 10, 1916.
1,256,793.
Patented Feb. 19, 1918.
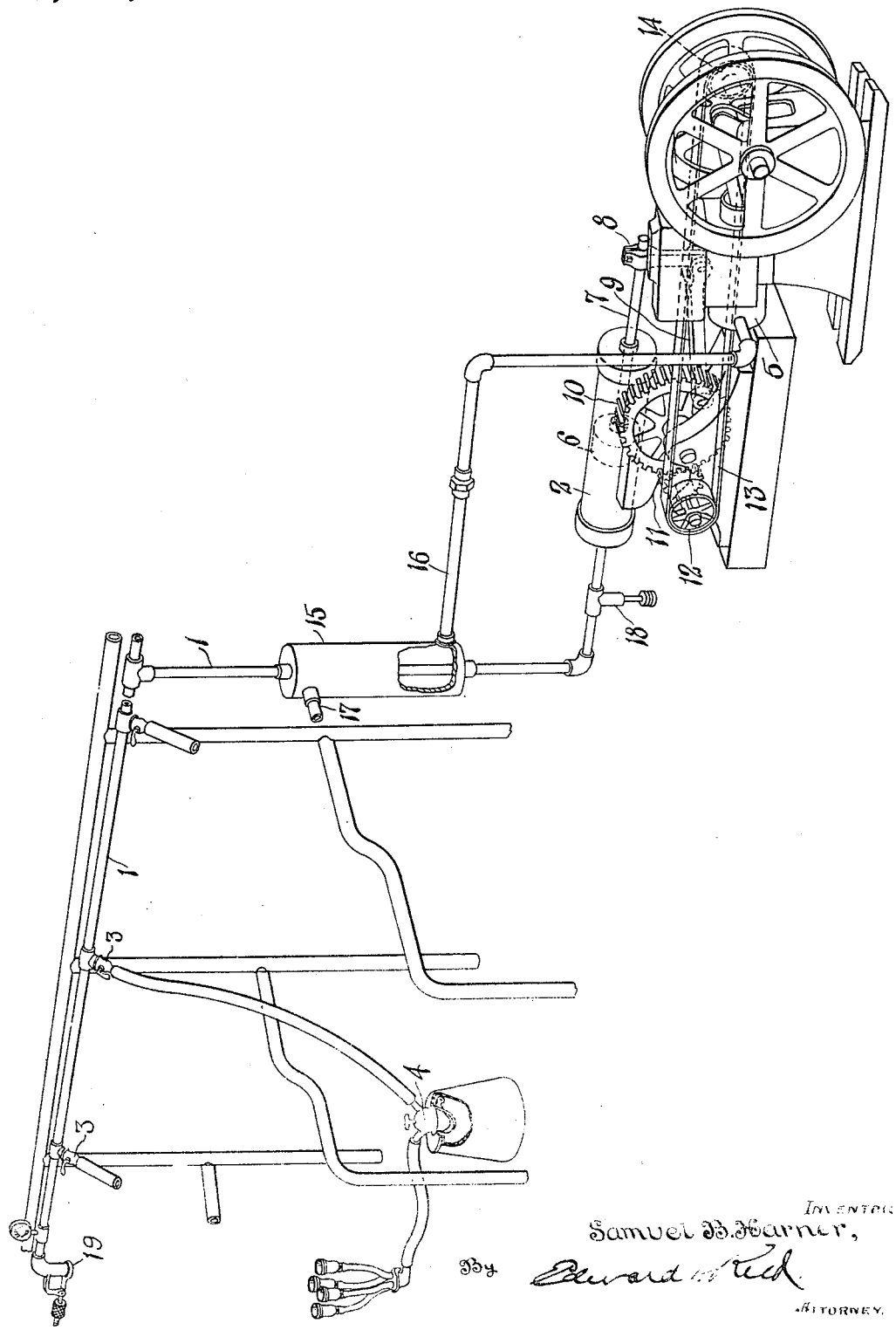
Inventor
Samuel B. Harner,
By Edward M. Reed
Attorney.

UNITED STATES PATENT OFFICE.

SAMUEL B. HARNER, OF NEAR XENIA, OHIO.

MILKING APPARATUS.

1,256,793.  Specification of Letters Patent.  Patented Feb. 19, 1918.

Application filed November 10, 1916. Serial No. 130,515.

*To all whom it may concern:*

Be it known that I, SAMUEL B. HARNER, a citizen of the United States, residing near Xenia, in the county of Greene and State of Ohio, have invented certain new and useful Improvements in Milking Apparatus, of which the following is a specification, reference being had therein to the accompanying drawing.

This invention relates to milking apparatus.

Milking machines as most generally used comprise air pipes leading from an air pump to the milking devices. In some instances a single pipe leads from the air pump and is adapted to have connected therewith a plurality of milking devices, or milking units. In other instances a separate air pump is provided for each milking unit and the several pumps are operated from a common source of power. While, of course, milk does not, in either case, enter the air pipes, the air which circulates in these pipes does come in contact with the milk in the air chamber and in the conduit leading from the teat cups to the milking chamber. As a result moisture is carried into the pipes and adheres thereto, thus producing an unsanitary condition and frequently causing an offensive odor, which may be communicated to the milk. Further the moisture enters the valves, and in cold weather will sometimes cause them to freeze.

The object of the present invention is to provide means for removing the moisture from the air pipe, or pipes, and for maintaining the same in a dry, sanitary condition, and free of odor; and to provide such means which will be simple in construction and operation, and which can be maintained and operated at a very low cost.

The drawing is a perspective view of a milking apparatus with my invention applied thereto.

In this drawing I have illustrated my invention as applied to that type of milking apparatus comprising a single air pipe leading from the air pump and having means for connecting the milking devices therewith at a plurality of different points along its length, and I have utilized the exhaust from the engine, which operates the air pump, as a source of heat. It is to be understood, however, that the invention is applicable to milking apparatuses of different kinds and that the heat may be secured from any suitable source.

In the present embodiment of the invention the air pipe is shown at 1 and leads from an air pump 2 along the stanchions in the stalls and is provided at intervals with valved connecting devices 3 to each of which may be connected a suitable conduit, such as a flexible tube, leading to the milking devices, which are shown as a whole at 4, there being preferably one such connecting device for each stall. The pump 2 is, in the present instance, operated by an internal combustion engine 5, which is belted to the pump. Obviously the particular structure of the pump and the manner in which it is driven from the engine are unimportant. In the present arrangement however the pump comprises a single elongated cylinder having mounted therein a piston 6 having a piston rod 7 which extends beyond the end of the cylinder and is connected by means of a yoke 8 with a pitman 9, which in turn is connected with a crank wheel, or a gear, 10 mounted on the pump structure and meshing with a pinion 11, to which is secured a belt wheel 12. A belt 13 passes about the belt pulley 12 and about a corresponding belt pulley 14 on the engine shaft.

To keep the pipes and valves in a dry, sanitary condition I have provided means for heating the air which circulates through the milking apparatus. This may be accomplished in various ways, but one very simple method consists in mounting a heating drum 15 on the air pipe and connecting the same with a suitable source of heat. In the construction here illustrated the drum is mounted close to the pump and is connected with the exhaust pipe 16 of the engine, the exhaust pipe being connected with the drum near one end and an exhaust outlet 17 being provided for the drum near its other end, thus causing the exhaust from the engine to circulate through the drum about the air pipe and to heat the latter. In this manner air passing through the pipe is heated and the moisture removed therefrom, thus preventing the moisture from being deposited within the pipes and valves. The pipe, or pipes, will be heated and should any moisture be deposited therein it will be quickly evaporated, thus maintaining the pipe in a dry, sanitary condition. Further the heat within the pipe will be sufficient to convert the moisture into steam which will thoroughly sterilize the pipes. The air pipe is preferably provided near its ends with relief valves 18 and 19, the valve 18 operating to prevent an excess of suction and the valve 19 operating to prevent an excess of pressure, on the respective strokes of the piston of the pump, and these valves further serve to supply the pipe with fresh air, and to eliminate odors. By providing the pump with a capacity in excess of that necessary to accomplish the milking a quantity of fresh air will be admitted to the air pipe on each suction stroke of the pump and a portion of the air in the pipe will be discharged upon each pressure stroke of the pump, thus providing a constant supply of fresh air, as obviously the inlet valve may be so located that it will supply only pure, fresh air.

It will be apparent that I have provided a device which will not only maintain the pipes in a dry, sanitary condition, but will also tend to sterilize the same, and to supply them with pure, fresh air. While the heat will be applied to the pipe only during the operation of the engine and pump the pipe will nevertheless be so heated that it will cause to be evaporated any moisture which may be in the same at the end of the milking operation. Further the construction of the device is simple, and it can be operated and maintained at a negligible cost. As a matter of fact under ordinary circumstances there would be no cost whatever for maintenance or operation of the heater. While I have, in the present instance, illustrated the device as comprising a single heater applied to an air pipe of a milking apparatus, which comprises but a single air pipe to which the several units are connected, it will nevertheless be obvious that the invention can be readily adapted to milking apparatuses of various kinds.

While I have shown and described one embodiment of my invention I wish it to be understood that I do not desire to be limited to the details thereof as various modifications will occur to a person skilled in the art.

Having now fully described my invention, what I claim as new and wish to secure by Letters Patent is:

1. In a milking apparatus, an air pipe adapted to have milking devices connected therewith, an air pump to cause a movement of air in said pipe toward and from said milking devices, and means to maintain the air within said pipe in a dry sanitary condition.

2. In a milking apparatus, an air pipe adapted to have milking devices connected therewith, means to cause a movement of air from said milking devices toward said pipe and means to dry said air.

3. In a milking apparatus, an air pipe adapted to have milking devices connected therewith, means to cause a movement of air from said milking devices toward said pipe, and means to apply heat to the exterior of said pipe.

4. In a milking apparatus, an air pipe adapted to have milking devices connected therewith, an air pump to intermittently create a suction within said pipe to operate said milking devices, and a heater connected with said pipe, to maintain the air in the pipe in a dry sanitary condition.

5. In a milking apparatus, an air pipe adapted to have milking devices connected therewith, an air pump to create a suction within said pipe to operate said milking devices, and a heater connected with said pipe between said pump and said milking devices.

6. In a milking apparatus, an air pipe adapted to have milking devices connected therewith, an air pump to cause a movement of air from said milking devices toward said pipe, a heating drum mounted on said pipe, and means to introduce heat into said drum.

7. In a milking apparatus, an air pipe adapted to have milking devices connected therewith, an air pump to cause a movement of air from said milking devices toward said pipe, an engine to actuate said pump, and a heater for said pipe connected with the exhaust outlet of said engine.

8. In a milking apparatus, an air pipe adapted to have milking devices connected therewith, an air pump to cause a movement of air from said milking devices toward said pipe, an engine to actuate said pump, a heating drum embracing said pipe, and an exhaust pipe leading from said engine to said drum.

9. In a milking apparatus, an air pipe adapted to have milking devices connected therewith, means to cause a circulation of air within said pipe including relief valves connected therewith, and means to heat the air within said pipe.

10. In a milking apparatus, an air pipe adapted to have milking devices connected therewith, an air pump connected with said pipe to operate said milking devices, means to heat said pipe, and valves to permit the ingress and egress of air to and from said pipe.

11. In a milking apparatus, an air pipe adapted to have milking devices connected therewith, means to cause a movement of air from said milking devices toward said pipe, and means to convert into steam the moisture which enters said pipe with the air.

In testimony whereof, I affix my signature hereto.

SAMUEL B. HARNER.